June 9, 1964 H. R. DAY, JR., ET AL 3,136,441
GAS TIGHT SEAL AND METHOD OF MANUFACTURE
Filed June 1, 1960
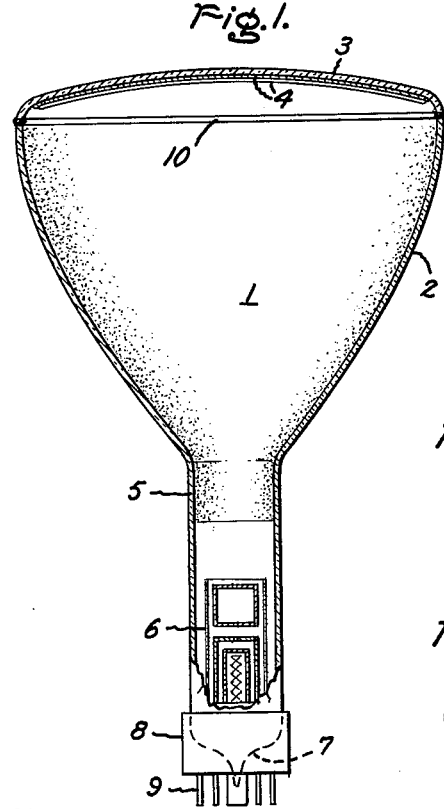
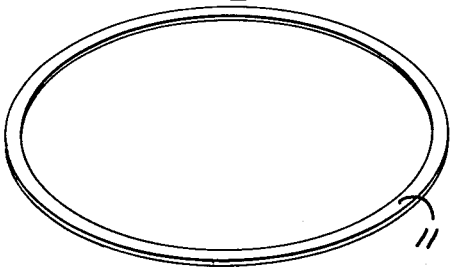
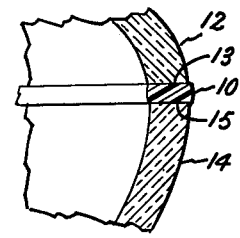
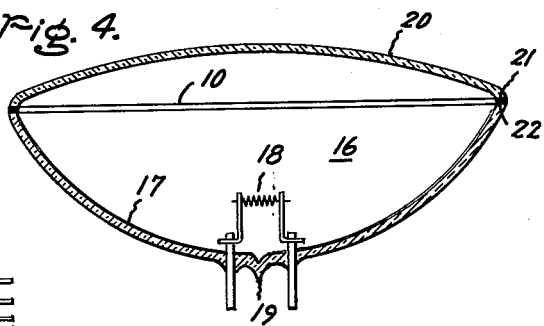
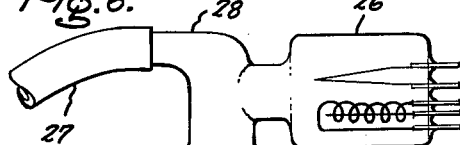
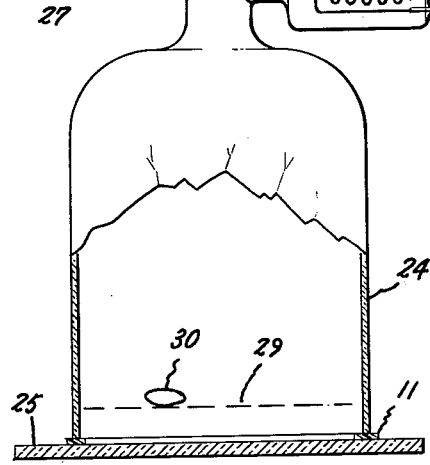
Inventors:
Harold R. Day, Jr.
Edith M. Boldebuck,
John W. Eustance,
by Richard R. Brainard
Their Attorney.

United States Patent Office 3,136,441
Patented June 9, 1964

3,136,441
GAS TIGHT SEAL AND METHOD OF MANUFACTURE
Harold R. Day, Jr., Burnt Hills, and Edith M. Boldebuck and John W. Eustance, Schenectady, N.Y., assignors to General Electric Company, a corporation of New York
Filed June 1, 1960, Ser. No. 33,129
11 Claims. (Cl. 220—2.1)

This invention relates to gas-tight envelopes of the type suitable for enclosing electrical devices and in particular to the method of making such envelopes.

It is frequently necessary to form glass envelopes, or envelopes of similar materials, from two or more principal components, as in the case of a sealed beam headlight wherein a lens is peripherally secured to a reflector provided with a pre-deposited coating. Sealing together the components of such two-piece envelopes is conventionally accomplished by welding, or melting, the glass pieces together with a gas torch flame. Unfortunately, this high heat with subsequent cooling, sets up high stresses in the glass components which cannot be entirely relieved even by means of a costly, high temperature annealing procedure. The resulting envelope is therefore subject to breakage due to mechanical shock, or due to differential expansions occasioned by temperature change.

In the case of the sealed beam light, the intense glass welding heat employed to melt the edges together also severely limits the choice of the mirror material deposited on the reflector. Aluminum is conventionally used for reflector material but is deleteriously affected around the edge of the reflector by the high heat employed, resulting in impairment of its reflection properties. A better choice of reflecting material is silver, but, unfortunately, silver will not tolerate the high welding heats employed at all.

In many cases it would be very advantageous to similarly construct glass cathode ray tubes from two complete preformed sections in order to facilitate production of their internal structures. At present, most cathode ray tubes or television picture tubes are, in effect, formed as one piece and the screen phosphors, reflecting materials, and the like are applied to the inside of the tube face through the narrow neck of the tube. If the tube face including its attendant screen structure could be separately produced and then joined to the funnel portion, this difficult construction would be avoided. However, the glass welding procedures employed heretofore to join the portions together tend to disintegrate and destroy the temperature-sensitive face plate materials, making pre-application of the materials very difficult.

Use of a low temperature solder glass for sealing is not a particularly good solution to the problem since the resulting envelope is subject to shock and heat stress in the same manner as a welded envelope produced at a higher temperature. That is to say, any such glass weld hardens into the same type of rigid glass joint characterized by inherent stress. Such joints have required a costly time consuming process of slow heating and cooling, or annealing, for, to some degree, minimizing stresses. Expansion characteristics of the materials should also be matched, but even with all these precautions, stress problems still remain since they are frequently dependent not only upon the material composition but also on the shapes of the component envelope pieces. When non-uniform heating is present, for example, stresses of distortion and differential expansion result.

It is proposed as desirable to employ some other sealing material between gas-tight envelope elements, arranged to impart the quality of plasticity for relieving the stresses occasioned in a rigid glass-to-glass seal. A seal should also be formed at temperatures under glass welding and annealing temperatures, thereby avoiding deleterious effects on phosphors and other materials. Various low melting point plastic adhesives are available but unfortunately many have vapor pressures and vapor permeabilities inconsistent with a gas-tight envelope, or have oxidation or disintegration points well below the temperatures at which the tube-making process must be carried out. Temperatures for cathode ray tube bakeout or out-gassing may be between 350° C. and 450° C., a temperature at which many plastic materials decompose. A suitable seal should be adhesive and non-gassy while sufficiently plastic to relieve stresses in the envelope, but must be sufficiently rigid to hold the component envelopes in close alignment with an amount of force sufficient to accomplish this result. The seal should also be able to withstand envelope bakeout temperatures without requiring much higher temperatures to wet and adhere the envelope portions together.

It is therefore an object of this invention to provide an inexpensive, composite gas-tight envelope which is relatively fracture-proof, has a gas permeability therethrough approaching that of glass, and which is capable of withstanding high bakeout temperatures.

It is another object of this invention to provide an improved, inexpensive gas-tight envelope which withstands envelope bakeout temperatures without requiring materially higher temperatures for the joining together the component parts of the envelope, whereby one or more of the component parts may include pre-formed temperature-sensitive materials.

It is another object of this invention to provide an improved, gas-tight envelope composed of two or more component pieces which may be of large size and diverse shapes, whose edges and expansion characteristics need not be perfectly matched, and which do not require subsequent annealing.

It is a further object of this invention to provide a method of rapidly forming a gas-tight envelope from separate portions, fulfilling the above objects, and for degassing the same without producing residual stresses therein.

The prior art drawbacks have been alleviated and the above objects attained in constructing an envelope from separate portions in accordance with the procedure of the present invention. Two mating components of the gas-tight enclosure, together with a sealing substance having novel sealing properties, are heated to near the degassing range of the constituent materials, while the components are urged together in juxtaposition under moderate pressure with the sealing substance therebetween. The enclosure is then degassed for a period of from a few seconds to several minutes in the same temperature range. The sealing compound discovered to be effective when properly employed in this combination is a fusible linear superpolyester of an aromatic dicarboxylic acid and a dihydric phenol having an intrinsic viscosity of at least 0.5 deciliter per gram.

According to a feature of the invention one component is pre-formed including a relatively temperature-sensitive material, e.g. including cathode ray tube phosphors.

The subject matter which we regard as our invention is particularly pointed out and distinctly claimed in the concluding portion of this specification. The invention, however, both as to organization, method of operation, together with further objects and advantages thereof, will be better understood by reference to the following description taken in connection with accompanying drawings, in which, FIG. 1 is a partial cross-sectional view of a cathode ray tube in accordance with the present invention, FIG. 2 is an illustration of a sealing gasket of thermoplastic material which may form a part of the cathode ray tube illustrated in FIG. 1, FIG. 3 is a cross-sectional view of a joint for sealing the pair of mating envelope portions, FIG. 4 is a cross-sectional view of a sealed beam headlight constructed in accordance with the present invention, FIG. 5 illustrates a process step in constructing a gastight envelope in accordance with one aspect of the present invention, and FIG. 6 is a partial cross-sectional view of an envelope designed for testing the residual pressure therein.

Referring to FIG. 1, a cathode ray tube manufactured in accordance with the present invention generally designated as 1 is formed from a funnel portion 2 and a mating face plate 3 the latter having a number of relatively temperature-sensitive screen layers 4 deposited thereon as desired. Such layers may include electro-luminescent phosphors, reflecting surfaces, and color television masking arrangements. The neck 5 of the funnel portion is provided with the usual electron gun structure 6 and is brought out to a tipped-off tubulation 7 surrounded by a base 8 having connecting pins 9 wired to the electron gun structure by lead in conductors, not shown. Between the matching edges of the funnel and faceplate portions of the tube there is disposed a sealing layer 10 composed of a fusible linear superpolyester of an aromatic dicarboxylic acid and a dihydric phenol having an intrinsic viscosity of at least 0.5 deciliter per gram, the choice and proper use of which contributes materially to the present invention.

The layer of sealing substance may take the form of a pre-formed gasket 11 illustrated in FIG. 2. Gasket 11 is prepared by pressing a film from the sealing compound and then cutting from the film an annular shape which matches the envelope edges to be sealed, as hereinafter described.

In FIG. 3 an enlarged cross-sectional view illustrates a first envelope portion 12 having an opening edge 13 juxtaposed with a second envelope portion 14 having a similar opening edge 15 nearly abutting the edge 13 with the sealing layer 10 disposed therebetween. The sealing layer 10 may take the form of gasket 11 of FIG. 2 or may be otherwise deposited on the edges of the respective envelopes as hereinafter more fully described. Envelope portions 12 and 14 correspond to the face plate and funnel of the cathode ray tube illustrated in FIG. 1, or may constitute the lens and reflector portions, respectively, of sealed beam light 16 illustrated in FIG. 4.

In FIG. 4 reflector portion 17 of a sealed beam light provided with a filament 18 and an exhaust tubulation 19, is formed to direct light through lens 20, the latter having its outside edge 21 secured to mating outside edge 22 of reflector portion 17. Between edges 21 and 22 there is again disposed a sealing compound 10 composed of a fusible linear superpolyester of an aromatic dicarboxylic acid and a dihydric phenol having an intrinsic viscosity of at least 0.5 deciliter per gram, and which may take the form of a gasket as illustrated in FIG. 2.

In accordance with the technique for constructing the cathode ray tube of FIG. 1 of the present invention, the two components of the envelope are first formed with mating opening edges for sealing together. These edges need not be accurately polished or highly regular but should be capable of generally facing one another. For example, the cathode ray tube may of a relatively large diameter or unusual shape wherein the mating edges are difficult to form within close tolerances and whose expansion characteristics are diverse. According to a feature of the invention the edges need be only capable of contacting the body of compound 10 disposed therebetween, which may take the form of the gasket 11 of FIG. 2.

The gasket 11 of FIG. 2 is formed by applying pressure and heat to the powdered form of a fusible linear superpolyester of an aromatic dicarboxylic acid and a dihydric phenol having an intrinsic viscosity of at least 0.5 deciliter per gram. This intrinsic viscosity is measured at 75° C. in 2,4,6 trichlorophenol solvent. Variations of this sealing material have different "melting" temperatures, but those here preferred for sealing purposes melt in excess of 300° C., but below the annealing point of the cathode ray tube glass, e.g., under 450° C. The 300° C. melting temperature mentioned here is considered the minimum temperature which will allow subsequent rapid outgassing or baking out of the completed envelope with preservation of the sealing substance.

In pressing out the gasket film, melting heat is preferably applied while the film is pressed so that correspondingly less pressure need be exerted upon it. When the envelope edges to be joined are somewhat irregular, care must be taken not to press the film out thinner than the degree of irregularity between the face plate and funnel portions. Once the film has been pressed at an elevated temperature, it may be quenched in water to render it relatively transparent and non-crystalline.

The film is then cut in the form of a gasket to match the inside and outside diameters of the edges to be joined and is then freely suspended in a vacuum oven by means of fine inert wires for a time sufficient to outgas or bake out occluded gases from the prepared gasket, a satisfactory temperature being between 150° and 200° C. If the newly formed gasket is used immediately outgassing may not be necessary. The gasket is immediately positioned as at 10 in FIG. 1, and face plate 3 is aligned with and pressed with a moderate force, for example, 50 lbs., toward funnel portion 2 against the intervening gasket. This force, exerted axially between the portions 2 and 3, is adjusted to be sufficient for pressing the envelope edges into the layer of material 10 to establish the seal. If the tube electrodes including the electron gun and getter have not been previously inserted in the funnel portion, they may be inserted after establishing the seal.

The pressing together of the envelope portions into the sealing material is preferably carried out at a temperature above the melting point of the sealing compound, and below the annealing temperature of glass. The temperature should be such that the compound wets the envelope edges for adhesion thereto, a temperature between 300° and 425° C. being preferred. The face plate 3 may therefore include pre-deposited, relatively temperature-sensitive layers 4, for example, phosphors, reflecting surfaces, and masking layers applied before the tube portions are joined.

In order to insure the interior of the assembly remains free of contaminants during the sealing operation, it may be flushed during the operation with pre-heated nitrogen. Alternatively, a vacuum pump may be attached to tubulation 7 for withdrawing gases from the tube, this vacuum being the normal vacuum applied in the manufacture of tubes. Such vacuum is also effective to supply the axial force required between the tube portions 2 and 3 for securing the seal. In any case a vacuum of approximately $10^{-7}$ mm. Hg is maintained upon the tube 1 through tubulation 7, after sealing during a degassing interval during which the entire envelope is maintained at a temperature in excess of 300° C. for "baking out" the occluded vapors and gases from envelope portions 2 and 3. The exact temperature employed for degassing will vary, determined by the speed at which degassing is to take place and the sealing material used. Since the glass commonly employed for the manufacture of cathode ray tubes anneals at around 450° C., a bakeout temperature in the range from 350° to 400° C. for fifteen to thirty minutes will be found satisfactory in most instances. If it is desirable to completely avoid discoloration effects which may occur with some of the sealing materials, bakeout may be carried out at a temperature below the melting point of the sealing material involved, although bakeout may alternatively continue above that temperature for less than half an hour without injury to the material, this time period being in excess of the time required in commercial bakeout practice.

The bakeout procedure may be combined with the sealing operation by merely decreasing the temperature for the bakeout period after the seal is established, meanwhile maintaining the vacuum. This bakeout is conventionally conducted with the individual cathode ray tube carried by an exhaust buggy, including a vacuum pump, travelling through an oven maintained at a temperature in the above range or, if desired, the cathode ray tube may be located on a base containing exhaust connections and an open bottom oven lowered over it. Before the vacuum being drawn on the envelope is discontinued, the tube cathode of the electron gun is activated and the getter is partially flashed. The tube is then sealed off at tubulation 7 and the getter flashing is completed.

As an alternative procedure to forming a gasket, especially when smaller envelope portions are involved, and mismatch of the surfaces to be joined is not as great a problem, the sealing compound, being a fusible linear superpolyester of an aromatic dicarboxylic acid and a dihydric phenol having an intrinsic viscosity of at least 0.5 deciliter per gram, may be applied to one, but preferably to both of the edges to be joined as a solution, paint or slurry. The material in finely divided powdered form is mixed with a binder, for example, a solution of nitrocellulose in a volatile organic solvent, for example, an alkyl ester of which amyl acetate is very suitable. The resulting slurry is applied to one or both of the envelope edges to be joined. The envelope portion is then heated in a furnace to drive off the solvent and the nitrocellulose at a final temperature in excess of the melting point of the basic sealing compound so that a quantity of sealing compound is fused to the edge of the envelope portion. The envelope portion, for example, funnel 2, FIG. 1, is then pressed against face plate 3 at a temperature in excess of the sealing compound's melting temperature.

Alternatively a solution of the sealing compound in a volatile organic solvent, e.g., tetrachloroethane, 2,4,6-trichlorophenol, chlorinated biphenyls, etc., may be used to coat the envelope edge.

The maintenance of a vacuum at tubulation 7 will exert sufficient force between the two envelope portions to insure the pressure necessary for sealing action. Alternatively, the envelope is flushed with dry, heated, inert gas and equivalent force exerted between the envelope portions. Face plate 3 may again contain pre-deposited layers of temperature-sensitive material, and if the necessary electrodes have not been added to the other envelope portion, this may be done after sealing, followed by a bakeout under vacuum. The bakeout is desirably carried on at a temperature in excess of 300° C. for approximately 15 minutes to half an hour, after which the cathode electrode is activated, the tube is sealed off at tubulation 7, and the getter is flashed.

A third alternative procedure is illustrated in FIG. 5. According to this procedure, the cathode ray tube envelope portions are prepared with mating edges and then at least one portion, for example, funnel 2, is heated to a temperature in excess of the fusing temperature of the sealing compound for a time sufficient for the edge to reach that temperature. This portion is then brought in contact with a quantity of the aforementioned sealing compound in its finely divided powdered form as illustrated at 23 in FIG. 5. Since the edge of funnel section 2 has been heated in excess of the fusion temperature of the compound 23, a portion of the compound will fuse to the edge and form a continuous band of polymer thereon.

After forming the band of polymer, face plate 3 is immediately applied thereto before considerable heat loss occurs. It is desirable that face plate portion 3 also be raised to the elevated temperature prior to being positioned upon funnel 2. If desired the face plate portion 3 may be similarly coated with polymer. The parts may be reheatable, for example, after juxtaposing the parts. The two sections are then pressed together with a suitable force, as for example, approximately 50 lbs., which may be provided by a vacuum inside the envelope, and the entire envelope is then baked out and completed in the same manner as described above.

The process is not limited to making cathode ray tubes alone but may be applied to the making of other hermetically sealed envelopes which may be required to withstand high temperatures while remaining gas-tight, for example, the sealed beam headlight of FIG. 4. In that instance, a reflecting coating is applied to reflector portion 17 prior to the sealing operation. Then the sealing compound 10 is applied in any one of the manners set out above to one or both of the mating edges 21 and 22. The completed structure is suitably baked out for a desired length of time, usually under one minute in the case of the light, an appropriate gas is added, and the completed device is sealed off at tubulation 19.

The sealing compound for constructing these gas-tight envelopes should answer the requirements of plasticity, a vapor pressure under $10^{-6}$ mm. of mercury, and a vapor permeability similar to that of glass, all at room temperature or operating temperature. While being able to withstand conventional bakeout temperatures for the envelope, it must be capable of sealing the envelope portions together at temperatures the same as, or not much in excess of, such bakeout temperatures. It, of course, must also possess adhesive properties and must therefore wet the surfaces to be joined at its melting temperature. The type of sealing compound which has been found to be very satisfactory is herein described as a fusible linear superpolyester of an aromatic dicarboxylic acid and a dihydric phenol having an intrinsic viscosity of at least 0.5 deciliter per gram measured at 75° C. in trichlorophenol. The material is also preferably selected with an intrinsic viscosity below 1.6 so that the material will flow somewhat at and above its melting point. Specific compounds of this type which are very satisfactory together with their preparation are described in an application by Simon W. Kantor and Fred F. Holub, Serial No. 33,124, assigned to the assignee of the present application and filed concurrently herewith. These compounds include combinations comprising constituents of at least one from each of the first two of the following groups which, if desired, may also include any of the members of the other groups:

(1) p-phenylene, mono and dichloro-substituted p-phenylene radicals
(2) isophthalate, mono and dichloro-substituted isophthalate radicals
(3) o-phenylene, m-phenylene, o-biphenylene, p-biphenylene, p,p'-diphenylene ether and p,p'-diphenylene dimethyl methane radicals
(4) o-phthalate, terephthalate and diphenate radicals One particularly effective copolymer is formed by co-reacting hydroquinone with isophthaloyl chloride and terephthaloyl chloride yielding a superpolyester formed of p-phenylene isophthalate units interspersed with p-phenylene terephthalate units, wherein the intrinsic viscosity of the polyester is preferably at least 0.5 and the isophthalate content is preferably at least 60 mole percent of the total isophthalate and terephthalate content of the superpolyester. This copolymer is particularly disclosed and claimed in the copending application of Simon W. Kantor and Fred F. Holub, Serial No. 33,125, now Patent No. 3,036,990, filed concurrently herewith, assigned to the assignee of the present application, and is hereinafter referred to as hydroquinone isophthalate terephthalate or simply H.I.T., the name being derived from the constituents used in forming it. The hydroquinone isophthalate terephthalate or H.I.T. is preferably formed from 1 to 1.05 moles of hydroquinone, to 1 mole of the acid chlorides in which the proportions are from .6 to .9 mole of isophthaloyl chloride and from .1 to .4 mole of terephthaloyl chloride. The copolymers formed near the ends of the latter ranges are preferable because they have higher melting points more in keeping with the customary bakeout temperatures for the gas-tight envelopes under consideration.

H.I.T. prepared by co-reacting 1 to 1.05 mole of hydroquinone with .85 mole isophthaloyl chloride and .15 mole terephthaloyl chloride forms effective seals at temperatures from 400° to 415° C., and withstands bakeout temperatures in excess of 350° C. The envelopes formed therewith may actually be baked out in or near the melting range of the material, that is, above 385° C., if desired, for approximately one-half hour. This sealing compound remains in satisfactory condition near 400° C. for a length of time sufficient for baking out a cathode ray tube, e.g., one-half hour, but if the temperature of bakeout is lowered to 365° C., the bakeout may be continued for several hours without adversely affecting the seal. If the longer periods of bakeout are desired at higher temperatures, it is preferred to carry out the procedure in an inert atmosphere or at least under substantially anhydrous conditions.

The H.I.T. composition, prepared with .85 mole isophthaloyl chloride and .15 mole terephthaloyl chloride is well suited for the method of establishing a fused seal along the edge of one or more of the envelope components, as illustrated in FIG. 5, and this same combination is also very satisfactory for forming the gaskets, for example, gasket 11 of FIG. 2 in accordance with the first procedure hereinbefore set out.

The following specific example is given as one instance in which the invention may be practiced. This example is used for explanatory purposes only and is not to be considered in a limiting sense. A powdered form of H.I.T. prepared as in the above referred to application with 1.03 mole hydroquinone, .85 mole isophthaloyl chloride and .15 mole terephthaloyl chloride is heated to a temperature of 200° C. in an oven for 20 minutes, which is sufficient to evaporate the water therefrom. This mass is pressed together between opposed dies faced with aluminum foil which are heated to a temperature of 400° C. by means of internal electrical elements, and one of which is arranged to hold or contain the compound, and these dies are urged together in a press exerting a pressure of 200 p.s.i. The resulting film of the superpolyester is pressed out to a thickness of 10 mils which is immediately quenched in water, peeled from the aluminum foil, and then cut out in a measured annular pattern or gasket. The gasket is measured for overlapping slightly the inside and outside diameters of the matching soft glass plate and funnel portions, 3 and 2, of the cathode ray tube in FIG. 1, these glass portions being the type which anneal at 450° C. The prepared annulus is suspended in an oven by means of fine inert wires at a temperature of 200° C. in order to outgas the gasket, and the gasket is then immediately inserted between juxtaposed funnel portion 2 and face plate 3, the latter having been precoated on the inside with cathode ray tube phosphor. A pressing force of 50 pounds is exerted axially between the two portions and while the whole cathode ray tube is simultaneously heated in an oven for 15 minutes at 400° C. so that the envelope edges contacting the gasket will have time to reach that temperature and "sink" into the gasket material. The enclosure is flushed during the operation with dry nitrogen to insure rapid removal of any contaminants.

After thus establishing the seal, the tube is completed by the addition of an internal aquadag electrode, an electron gun and a getter. The tube is reheated to 365° C. while maintaining a vacuum of $10^{-7}$ mm. Hg for three hours to bake out the tube to a high state of perfection, equal to the $10^{-7}$ mm. Hg being drawn by the vacuum pump. During the conclusion of this period the cathode is activated and the getter is partially flashed, after which the tube is "tipped off" the vacuum system and the getter flashing is completed. Such a tube has maintained an internal ambient pressure of $10^{-7}$ mm. Hg for several months.

In addition to hydroquinone isophthalate terephthalate and equivalents thereof, the following materials have also been found quite useful. These materials listed as follows, have some variations in melting point, the melting point being readily ascertainable and dependent upon the various composition percentages taught by the patent applications referred to below. While it is possible to form some of these polyesters which melt below 300° C., most of them do not melt, or do not melt to a material degree, below that temperature, and the present invention is particularly directed to employing constituents selected for melting above 300° C. The seal is formed above the melting point of the material while the resultant envelope is baked out near or below the same temperature:

(1) Linear superpolyesters of p-phenylene isophthalate having an intrinsic viscosity of at least 0.5 wherein the p-phenylene radicals are selected from the group consisting of p-phenylene, monochloro-p-phenylene and dichloro-p-phenylene radicals, disclosed and claimed in the copending application of Simon W. Kantor and Fred F. Holub, Serial No. 33,141, assigned to the assignee of the present application and filed concurrently herewith.

(2) Linear superpolyesters formed of p-phenylene isophthalate units interspersed with p,p'-biphenylene isophthalate units, the intrinsic viscosity of the superpolyester being at least 0.5, and the p-phenylene isophthalate units being at least 40 mole percent of the total p-phenylene isophthalate and p,p'-biphenylene isophthalate units in the superpolyester, disclosed and claimed in the copending application of Simon W. Kantor and Fred F. Holub, Serial No. 33,126, now Patent 3,036,991, assigned to the assignee of the present application and filed concurrently herewith.

(3) Chlorine-containing, p-phenylene isophthalate, linear superpolyesters having an intrinsic viscosity of at least 0.5 wherein at least 15 mole percent of the isophthalate radicals have from one to two chlorine substituents on the aryl nucleus and the p-phenylene radicals are selected from the group consisting of p-phenylene, monochloro-p-phenylene and dichloro-p-phenylene groups, disclosed and claimed in the copending application of Simon W. Kantor and Fred F. Holub, Serial No. 33,127, assigned to the assignee of the present application and filed concurrently herewith.

(4) Linear, superpolyesters having an interinsic viscosity of at least 0.5 and formed of four structural units: (1) p-phenylene units (2) units selected from the group consisting of o-phenylene units, m-phenylene units and o,o'-biphenylene units (3) iso-phthalate units and (4) terephthalate units, the sum of (1), (2), (3) and (4) equalling 100% of the total units of the polymer, the units of (1) being from 25 to 45% of the total units, the units of (2) being from 5 to 25% of the total units, the units of (3) being from 20 to 45% of the total units, the units of (4) being from 5 to 30% of the total units, the units of (1) and (2) forming esters with the units of (3) and (4), the sum of (1) and (2) being from 1 to 1.05 times the sum of (3) and (4) and the sum of (1) and (4) being no greater than 0.7 times the total sum of units, disclosed and claimed in the copending application of Simon W. Kantor and Fred F. Holub, Serial No. 33,128, now Patent 3,036,992, assigned to the assignee of the present application and filed concurrently herewith. These polyesters are preferred for the preparations of solutions, paints or slurries for forming the sealed joint according to the second procedure hereinbefore set out and are adapted for forming cathode ray tube seals and the like.

(5) Linear superpolyesters formed of m-phenylene terephthalate units interspersed with from 0 to 30 mole percent of p-phenylene terephthalate units, based on the total m-phenylene terephthalate and p-phenylene terephthalate units, the intrinsic viscosity of said superpolyester being at least 0.5, disclosed and claimed in the copending application of Simon W. Kantor and Fred F. Holub, Serial No. 33,130, assigned to the assignee of the present application and filed concurrently herewith.

Another specific example of a seal according to the present invention employs p-phenylene, m-phenylene isophthalate formed by reacting .545 mole hydroquinone and .472 mole resorcinol with one mole isophthaloyl chloride, a compound soluble in cresol at room temperature as a clear solution. A powdered form of this compound is prepared and placed in an open container while cathode ray tube funnel and face plate including electrodes are heated to 375° C. for 15 minutes. The funnel is dipped in the powder and then pressed against the face plate for 5 minutes with a vacuum of 20 mm. Hg being drawn on the funnel tubulation. The heat is then lowered to 310° C. and the vacuum is increased to $10^{-5}$ mm. Hg for a period of one half hour for baking during which time the getter is partially flashed and after which the tube is tipped off and getter flashing completed.

Successful seals have also been made with various specific materials, for example, with polyesters obtained by reacting: .7 mole hydroquinone and .3 mole catechol with .7 mole isophthaloyl chloride and .3 mole terephthaloyl chloride; or .6 mole hydroquinone and .4 mole catechol with .7 mole isophthaloyl chloride and .3 mole terephthaloyl chloride. Further, seals have been formed with a superpolyester of p-phenylene chloroisophthalate as well as a superpolyester of monochloro-p-phenylene isophthalate.

In FIGURE 6 is illustrated an apparatus for ascertaining the gas-tight sealing properties of the various materials hereinbefore disclosed. It has been employed primarily for gathering data upon the vapor pressure and vapor permeability of a seal, for example, in the form of a gasket 11 established between two envelope portions comprising bell 24 and glass plate 25. At the upper end of bell 24 is connected a gas-tight triode ion gage 26 and a hose 27 for attaching to a vacuum pump (not shown). To perform the test, a gasket 11, for example, is pressed out of the powdered form of a sealing material or cut from a sheet of the material. The gasket is degassed and pressed between bell 24 and glass plate 25 in the same manner as herein described for forming a hermetically sealed envelope. After the seal is established, a vacuum of $10^{-7}$ mm. of mercury is drawn through hose 27 during a period when the entire bell and plate are subjected to bakeout temperatures near the melting point of the particular sealing material employed for gasket 11. The bell is tipped off at point 28 and the hose 27 is removed. The triode ion gage 26 is connected in a conventional circuit (not shown) for measuring the gas ions, this being a function of the residual gas pressure within the bell. The above test has shown the sealing materials set out above to exhibit an ambient total pressure including vapor pressure and vapor permeability, of better than $10^{-7}$ mm. of mercury at room temperature, well within the requirements of gas-tight envelope baking for electrical purposes. The seal may also be formed by procedures alternative to the gasket method as hereinbefore set out.

If desired, the vapor pressure of a particular material may be isolated by a similar apparatus wherein the bell 24 is completely enclosed as along dashed line 29 with a body of a proposed sealing compound 30 included therein. The pressure inside the bell is then measured with the ion gage. Under such a test the compounds herein disclosed have exhibited vapor pressures of less than $10^{-7}$ mm. of mercury at room temperature.

While glass envelopes and methods of making the same have been disclosed herein, the present invention is not limited to envelopes having only glass portions. The present invention may be applied to glass and metal envelopes, metal and ceramic envelopes, for example, copper and ceramic envelopes glass and barium titanate envelopes, or to various other combinations of the above materials, for example, metal-to-metal envelopes. Additional useful materials for forming the envelope component portions will occur to those skilled in the art. When oxidizable component portions are employed, it is desirable to carry on all steps, which may require temperatures above the oxidation temperatures of such components, in a vacuum or in an inert anhydrous atmosphere. When the procedure is carried on in a vacuum, the components may be stacked in an enclosure upon which a vacuum is drawn and the envelope is thereby completed without requiring a tubulation for tipping off. Baking out may also be accomplished at the same time. The hermetically sealed enevelope according to the present invention possesses numerous advantages. Large envelopes may be formed from envelope portions of diverse shapes without resulting in a fragile product, because of the inherent slight plasticity of the sealed joint at room temperatures. It will be appreciated that this plasticity in a resinous joint is not so great as to allow displacement of the component parts of the envelope but is only great enough to relieve the extreme stresses which have heretofore rendered such envelopes subject to breakage due to mechanical shock or rapid temperature change. And, according to a feature of the present invention, the envelope portions may have somewhat irregular edges with the discrepancy being taken up at the sealed joint.

The joints are formed at or above customary bakeout temperatures for vacuum devices, but the temperatures required are not high enough to deleteriously affect predeposited layers of temperature-sensitive materials, for example, phosphors, included in the envelope portions, nor to require subsequent annealing. The resulting envelope will tolerate bakeout temperatures employed for baking out occluded gases from such envelopes for commercially acceptable periods of time. The resulting envelopes will maintain a good vacuum on the order of $10^{-6}$ mm. of mercury and often better. Furthermore, the sealed joints are radiation-resistant, resistant to electron bombardment and have very good insulating and dielectric properties. The resulting joints are extremely strong and are able to withstand considerable tension and compression forces. The seal is compatible with tungsten filaments, oxide cathodes and phosphor screens, resistant to attacks of mercury vapor and radiation from gas discharge. Tubes have been constructed according to the present invention and operated continuously for months while maintaining vacuums of better than $10^{-7}$ mm. of mercury.

If desired, entire envelopes may be formed from the materials herein disclosed for sealing the joint between two envelope portions, and use of these sealing materials may also be made within the envelope, for example, for windows, as insulating spacers for electrodes and for sealing lead ins. The sealing material is also useful for coating the outside or inside of the envelope formed of other materials to improve gas permeability and mechanical strength properties. The sealing materials herein disclosed are also resistant to water or moisture permeation.

While we have shown and described several embodiments of our invention, it will be apparent to those skilled in the art that many changes and modifications may be made without departing from our invention in its broader aspects; and we aim therefore in the attendant claims to cover all such changes and modifications as fall within the true spirit and scope of our invention.

What we claim as new and desire to secure by Letters Patent is:

1. The method of forming a hermetically sealed envelope from separate portions comprising the steps of preparing two said portions with common surfaces of closure, said portions being formed of low vapor pressure, low gas permeability material selected from the group consisting of glass, metal, ceramic and barium titanate, bringing a thermoplastic material in contact with at least one of said surfaces at a temperature in excess of 300° C., but below the annealing point of the envelope portions, said thermoplastic material comprising a fusible linear superpolyester of an aromatic dicarboxylic acid and a dihydric phenol having an intrinsic viscosity of at least 0.5 deciliters per gram, pressing said surfaces together in juxtaposition with said thermoplastic material therebetween, and baking said composite envelope at a temperature in excess of 300° C., but below the said annealing point.

2. The method of constructing a gas-tight envelope from separate portions comprising the steps of forming two of said portions of low vapor pressure low gas permeability materials selected from the group consisting of glass, metal, ceramic and barium titanate with similar closure edges, preparing a gasket of thermoplastic material constructed to match said edges, said thermoplastic material being a fusible linear superpolyester of an aromatic dicarboxylic acid and a dihydric phenol having an intrinsic viscosity of at least 0.5 deciliter per gram, pressing said envelope portion edges together in abutting relation with said gasket between, heating at least a portion of the resulting joint to a temperature in excess of 300° C. to fuse said gasket to said edges, and heating said composite envelope in excess of 300° C. under vacuum for degassing.

3. The method as set forth in claim 2 wherein said gasket is formed from a film pressed out from said fusible linear superpolyester, and wherein said gasket is degassed at a temperature in excess of 150° C. prior to being placed between said abutting edges.

4. The method of constructing a gas-tight envelope from separate portions formed of low vapor pressure low gas permeability material selected from the group consisting of glass, metal, ceramic and barium titanate comprising preparing two such portions with similar closure edges, applying a solution of a fusible linear superpolyester of an aromatic dicarboxylic acid and a dihydric phenol having an intrinsic viscosity of at least 0.5 deciliter per gram and a melting point above 300° C. but below 450° C., to at least one of said edges, volatilizing the solvent from the thus coated edges, thereafter bringing the edges of said two portions into juxtaposition under moderate pressure at a heat in excess of said melting point, and degassing the resulting envelope under vacuum at a temperature in excess of 300° C. but below 450° C.

5. The method of constructing a gas-tight envelope from separate portions formed of low vapor pressure low gas permeability materials selected from the group consisting of glass, metal, ceramic and barium titanate comprising forming a closure edge on at least one of said portions, heating said edge above the fusion temperature of a fusible linear superpolyester of an aromatic dicarboxylic acid and a dihydric phenol having an intrinsic viscosity of at least 0.5 deciliter per gram and a fusion point above 300° C. but below 450° C., bringing said heated edge in contact with a quantity of said linear polyester in powdered form so that a portion of said polyester fuses to said edge, pressing said portions together in abutting relationship, and degassing the envelope, thereby formed, under vacuum at a temperature between 300° C. and 450° C.

6. The method of constructing a gas-tight envelope to be baked out at temperatures in excess of 300° C. but below 450° C., comprising the steps of preparing a pair of envelope portions formed of material selected from the group consisting of glass, metal, ceramic and barium titanate with mating closure edges, attaching to one of said portions phosphor material having a tendency to deteriorate at temperatures in excess of 450° C., thereafter heating said edges to a temperature in excess of 300° C. but below 450° C., and pressing said edges together with a thermoplastic resin therebetween, said thermoplastic resin being a fusible linear superpolyester of an aromatic dicarboxylic acid and a dihydric phenol having an intrinsic viscosity of at least 0.5 deciliter per gram, so that said edges are fused together at a temperature below the deterioration temperature of said first named material.

7. A gas-tight envelope comprising a first portion having an edge boundary, a second portion having a similar edge boundary in juxtaposition with the first, said portions being formed of material selected from the group consisting of glass, metal, ceramic and barium titanate, and a layer of thermoplastic material between said edge boundaries forming a gas-tight seal therebetween, said material being a high decomposition temperature fusible linear superpolyester of an aromatic dicarboxylic acid and a dihydric phenol having an intrinsic viscosity of at least 0.5 deciliter per gram, and having a melting point in excess of 300° C.

8. The envelope as set forth in claim 7 wherein at least one of said portions includes a body of temperature-sensitive substance tending to disintegrate at temperatures in excess of 450° C.

9. A gas-tight envelope comprising at least a first portion having an edge boundary, a second portion having a similar edge boundary with its surface in juxtaposition with the first, said portions being formed of material selected from the group consisting of glass, metal, ceramic and barium titanate, the surface of said second edge boundary being somewhat irregular with respect to the first, and a layer of thermoplastic material between said edge boundary surfaces thicker than the degree of irregularity therebetween, so that said irregularities depend into said layer, said material being a high decomposition temperature fusible linear superpolyester of an aromatic dicarboxylic acid and a dihydric phenol having an intrinsic viscosity of at least 0.5 deciliter per gram, having a melting point in excess of 300° C. but below 450° C.

10. The method of forming a gas-tight joint between abutting surfaces of two materials, said materials being selected from the group consisting of glass, metal, ceramic and barium titanate, comprising the steps of placing a low vapor pressure plastic adhesive on at least one of said surfaces, said plastic adhesive being a fusible linear superpolyester of an armoatic dicarboxylic acid and a dihydric phenol having an intrinsic viscosity of at least 0.5 deciliter per gram and a melting point above 300° C., bringing said surfaces together under moderate pressure with said plastic adhesive therebetween, and heating the combination in excess of said melting point to fuse said adhesive to said both said surfaces.

11. The method of forming a gas-tight joint comprising the steps of pressing upon a surface a fusible linear superpolyester of an aromatic dicarboxylic acid and a dihydric phenol having an intrinsic viscosity of at least 0.5 deciliter per gram and a melting point above 300° C., and at the same time heating said superpolyester and said surface above said melting point, said surface being formed of material selected from the group consisting of glass, metal, ceramic and barium titanate.

References Cited in the file of this patent

UNITED STATES PATENTS

| | | |
|---|---|---|
| 2,593,846 | Clack | Apr. 22, 1952 |
| 2,595,343 | Drewitt et al. | May 6, 1952 |
| 2,892,747 | Dye | June 30, 1959 |
| 2,892,812 | Helbing | June 30, 1959 |
| 2,934,513 | Hicks et al. | Apr. 26, 1960 |
| 2,954,355 | Young et al. | Sept. 27, 1960 |
| 2,961,365 | Sroog | Nov. 22, 1960 |
| 3,036,990 | Kantor et al. | May 29, 1962 |
| 3,037,834 | Lederer et al. | June 5, 1962 |